June 23, 1964     G. DANIELSON     3,138,403

COMBINATION TABLE AND BENCH

Filed May 22, 1962     2 Sheets-Sheet 1

INVENTOR
GLEN DANIELSON
BY
Gardner & Zimmerman
ATTORNEYS

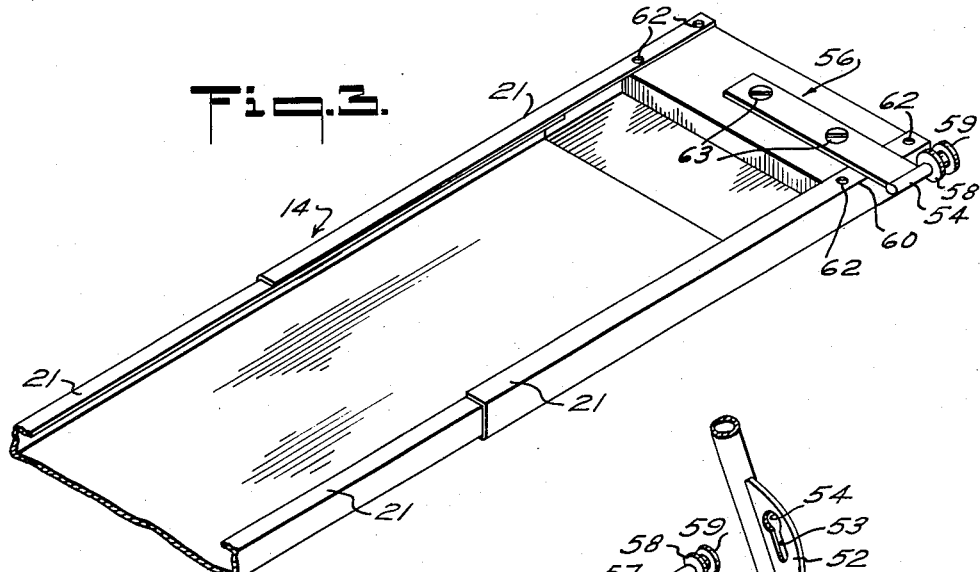
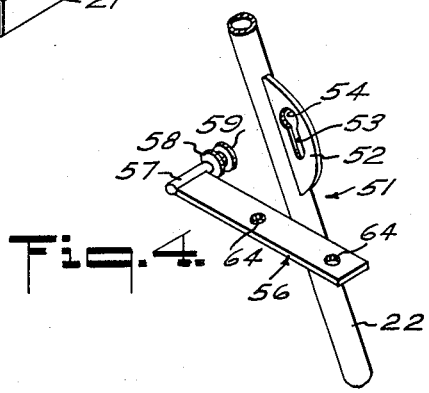
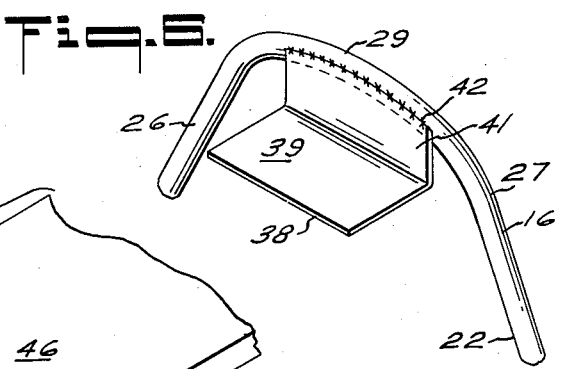
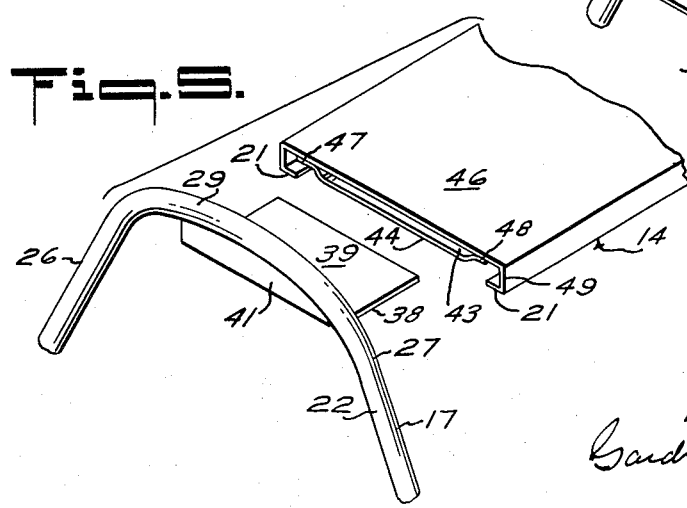

United States Patent Office 3,138,403
Patented June 23, 1964

3,138,403
COMBINATION TABLE AND BENCH
Glen Danielson, 92 Via Floreado, Orinda, Calif.
Filed May 22, 1962, Ser. No. 196,697
3 Claims. (Cl. 297—174)

This invention relates generally to tables and seating devices, and more particularly relates to a table and bench assembly suitable for positioning in an automobile and for use by children.

The general object of the present invention is to provide novel means for safely seating either one or more chlidren in a vehicle while affording a table surface which may be used to play on and which restrains the children from being thrown about.

Another object of the invention is to provide a table and bench assembly particularly suitable for use in the back seating area of an automobile, but which may be used in the automobile's front seating area or in places other than an automobile.

A further object is to provide a device of the character described which may be easily disassembled to permit storage of the component parts in a small space, such as the trunk of an automobile, and which may be reassembled either in or out of an automobile to form a unitary table and bench combination.

Still another object is to provide a device of the character described adapted for support on an automobile's seat and floor regardless of the vertical spacing therebetween, and which will not be tipped or rocked as a result of movement by the child or automobile.

An even further object is to provide a table and bench assembly of the character described which is selectively adjustable to extend across the full width of the back seat of an automobile and in such manner that the device will be securely lodged in position to assure against its displacement upon sudden motions of the vehicle or when the rear doors are opened.

A still further object is to provide a device having the foregoing advantages which may be economically manufactured, which has no obtruding corners or edges to cause harm to either the child or the automobile's upholstery, and which has the strength and durability required to withstand a child's abuse.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 3 is a fragmentary perspective view of the bottom of the bench panel of the structure shown in FIGURE 1;

FIGURE 4 is a perspective view of the latch assembly for mounting the bench panel shown in FIGURE 3;

FIGURE 5 is a perspective view showing the manner in which the table panel of the structure shown in FIGURE 1 is mounted on the side support members thereof; and FIGURE 6 is a perspective view of the bracket means used to mount the table panel shown in FIGURE 5.

Figure 1:
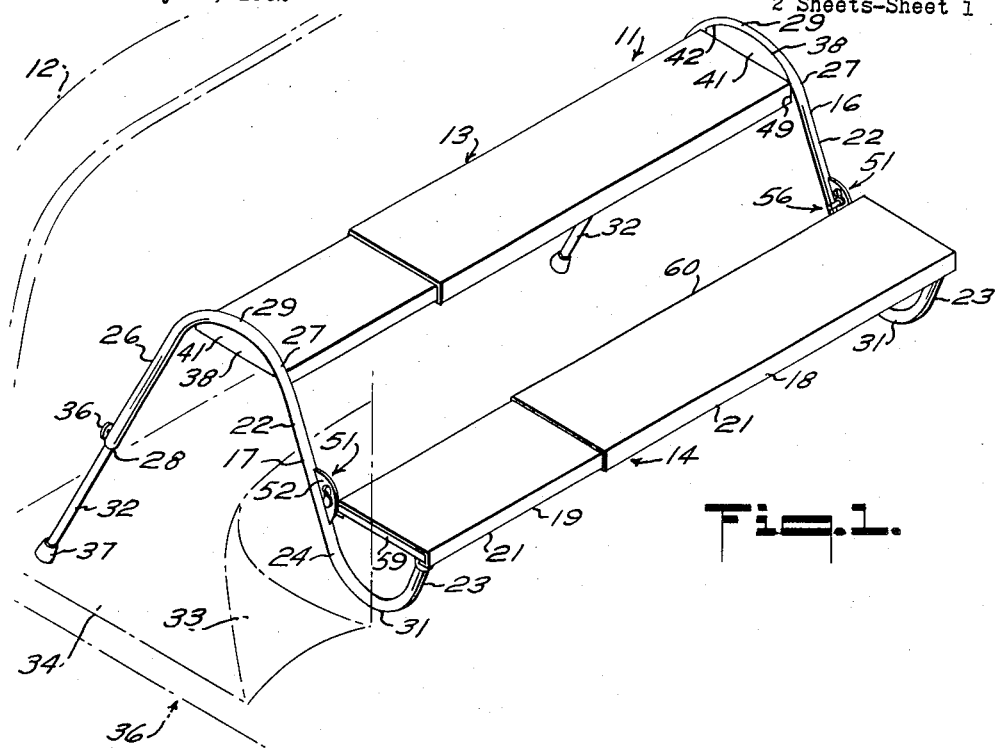
FIGURE 1 is a perspective view of a preferred embodiment of the present table and bench assembly and is shown positioned in the back seat area of an automobile.
Figure 2:
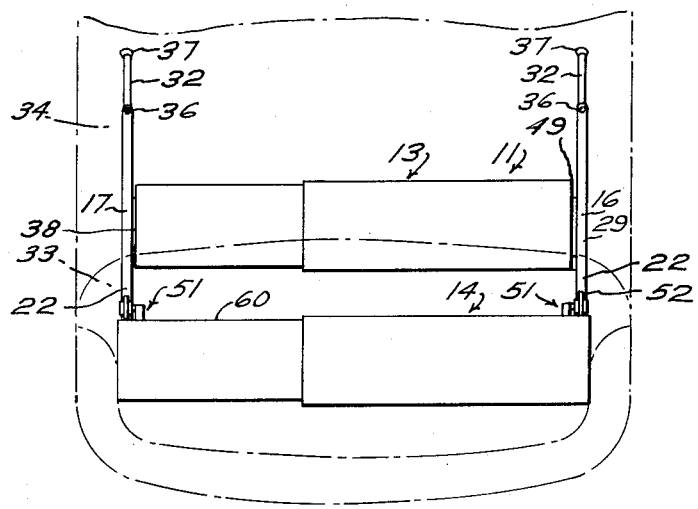
FIGURE 2 is a top plan view of the structure shown in FIGURE 1, also while positioned in the back seat area of an automobile.

Referring now to the drawings, and particularly FIGURES 1 and 2, the table and bench assembly of my invention is depicted generally by the numeral 11 and is shown positioned in the back seat area of an automobile 12. The assembly 11 includes a table panel 13 and a bench panel 14, the two panels being disposed horizontally in generally parallel spaced relationship and secured between two side support members 16 and 17. A child using my device is afforded a playing surface by the table panel 13 and is also restrained from being thrown about as often occurs in the normal automobile seating area. Moreover, the assembly 11 as illustrated is suitable for accommodating several children together.

With regard now to the preferred construction of the assembly 11, and particularly the table and bench panels 13 and 14, reference is made to FIGURE 3 wherein is shown a bottom view of the bench panel 14. Aside from the manner in which the panels are secured between the side support members, it will be appreciated that the table and bench panels are of substantially identical construction. The panel 14 as shown includes two portions 18 and 19 adapted for telescopic movement relative to one another, the portions preferably being of generally channel construction with one portion adapted to slide snugly within the other. Each of the channel portions 18 and 19 has two inwardly extending spaced flanges 21 to provide means for one channel portion retaining the other in the aforementioned sliding relationship.

Referring again to FIGURE 1, the side support member 17, which is a mirror image of the member 16, is seen to include an elongated medial portion 22 disposed in a substantially vertical plane and inclined at an angle from the horizontal. The member 17 further includes a rear support portion 23 extending upwardly from adjacent the bottom end portion 24 of the portion 22. A front leg 26 is secured integrally to the medial portion adjacent the upper end portion 27 thereof and extends downwardly and away from the portion 22. It will be noted that the bottom end 24 of the portion 22 and the bottom end 28 of the front leg 26 are preferably disposed in substantially the same horizontal plane, whereby the assembly 11 may be positioned on a substantially horizontal surface if desired.

It is preferred that the support member 17 be constructed of a single integral piece of tubular stock. In this manner the medial portion 22 is preferably integrally joined to the front leg 26 by an upper arcuate portion 29. The rear support portion 23 is similarly joined to the bottom end 24 of the portion 22 by a lower arcuate portion 31, the portion 31 being seen to form a rear leg support portion of the support member 17. The use of tubular construction further enables an adjustable front leg extension 32 to be slidably disposed within the leg 26. The assembly 11 thus can be placed in the automobile 12 which has the automobile seat 33 spaced above the floor 34, as shown in FIGURE 1. Means such as set screw 36 can be used to secure the extension 32 to the leg 26. To use the assembly on the ground or other horizontal surface the extensions 32 are simply removed to leave the lower arcuate portion 31 and the front leg end 28 in the same horizontal plane as noted above. Rubber tips 37 or the like may be secured adjacent the ends of the tubular side supports to avoid harm from sharp edges and to prevent the legs from sliding.

As regards the manner of securing the table panel 13 between the side support members, reference is now made to FIGURES 5 and 6 wherein are shown bracket members 38 secured to the supports 16 and 17. Each bracket 38 preferably includes an inwardly extending flat rectangular portion 39 and an upwardly extending flat portion 41. The ridge 41 is secured to the support member 16 adjacent the upper arcuate portion 29, and the portion 39 is disposed below the arcuate portion 29 and in a substantially horizontal plane. The bracket 38 preferably is secured to the support 16 by welding along the arcuate line of contact therebetween as depicted by the weld seam 42 in FIGURE 6.

In FIGURE 5 the table panel 13 is shown having a longitudinal slot 43 adapted to tightly receive the flat portion 39 of the bracket 38. Slots 43 are disposed adjacent both ends of the table panel 13 and are preferably formed by spacing a slot plate 44 beneath the panel's flat body portion 46. The plate 44 extends longitudinally along the underside of the panel 13 and is preferably welded to the panel along the plates' sides 47 and 48 which are deformed to join the panel body portion 46. By having the bracket portion 39 spaced below the upper arcuate portion 29, the table panel 13 is positioned intermediate the medial support portion 22 and the leg portion 26 whereby the corners 49 of the table panel are disposed in an unobtruding position that does not endanger a child. The upper arcuate portion 29, which extends above the ends of the table panel, is seen to provide a smooth contoured surface that is relatively safe for children.

The bench panel 14 is secured between the side supports 16 and 17 by means of latch assemblies 51 and the aforementioned rear support portions 23. In more detail, there is shown in FIGURE 4 a latch plate 52 extending upwardly from the medial support portion 22. The plate 52 has an elongated slot 53 with an enlarged upper opening 54. A latch 56, shown both in FIGURES 3 and 4, includes an engaging portion 57 with two spaced enlargements 58 and 59 adjacent one end thereof. Two latches 56 are suitably secured subjacent the ends of the bench 14 with the engaging portions 57 being laterally spaced from the edge 60 of the bench panel. To mount the bench, the engaging portions 57 are inserted through the openings 54 in the respective latch plates 52 and then dropped down into the slots 53 with the enlargements 58 and 59 being disposed on either side of the plates 52. Once the latch assemblies 51 are secured, the bench 14 is simply dropped down to abut on top of the rear support portions 23. A preferred manner of securing the latch 56 to the bench 14 is to insert a wood block 61 within the end portion of the channel shaped bench panel and secure it therein by screws 62 or the like. The latch 56 may then be secured to the wood block 61 by means of screws 63 disposed through latch holes 64. While welding the latches to the bench panel is also feasible, the aforementioned structure has been found to be more expeditious from the standpoint of economy.

In assembling the instant table and bench assembly, the table panel is first secured between the side supports by means of the brackets 38. The bench panel is then mounted by first securing the latch assembly 51 on one end of the bench. To secure the remaining latch assembly the engaging portion 57 thereof must be longitudinally aligned with the corresponding plate opening 54. The bench is then longitudinally expanded until the latch enlargements 58 and 59 are properly aligned relative to the slot 53, after which the latch is engaged with the slot and the bench panel is dropped onto the rear support portions 23. It is thus noted that the longitudinal adjustability of the bench slat is important in assembling the instant device. Inasmuch as the assembly 11 forms a relatively large unit, the feature of being able to disassemble the device allows it to be assembled after the component parts have been individually placed inside an automobile. Accordingly, there is little difficulty in moving the device in and out of an automobile.

In positioning the assembly 11 within an automobile the lower arcuate portions 31 of the side supports are disposed upon the automobile seat. The portions 13 support a substantial part of the child's weight and thus the arcuate shape serves to distribute this load to the seat without tending to tear through or otherwise injure the upholstery. The front leg extensions 32 are then adjusted to rest on the automobile floor while maintaining the bench and table panels substantially horizontal. It will be appreciated that when the device is used in the front seat area of an automobile having a "hump" on the floor the extension 32 of one leg may be simply adjusted for this variance. In addition, because the front legs 26 extend forwardly of the table panel maximum stability is achieved when the device is used in the back seat. More particularly, when the device is positioned in an automobile the angular disposition of the front legs enables them to extend substantially forwardly of the table panel notwithstanding the generally rearwardly inclined front seat of the automobile. This feature minimizes any tendency of the unit to rock forward from movements of the automobile or from the child placing its weight on the table panel.

Another important feature of the invention relates to the disposition of the assembly 11 in the back seat area of an automobile. As shown in FIGURE 2 the assembly is telescopically extended until the side supports and ends of the bench panel abut against and are wedged between the arm rests 66 or other stationary side portions of an automobile's back seat area. Because such side portions generally form a cushioning abutment it is possible in this manner to lodge securely the assembly 11 to assure additionally against any movement or displacement from sudden motion or when the rear doors are opened.

Unintended telescoping of the bench or table panels is sufficiently inhibited by the friction between the sliding portions. The transverse force imparted when a child is seated makes such telescoping virtually impossible. Clamping means, however, such as set screws or the like may be used to further assure against such movement if desired.

It will be appreciated that the instant table and chair assembly includes only four separable parts and is quickly assembled or disassembled. These parts, the two panels and two side supports, once disassembled may be readily stored together in a small space. However, notwithstanding this ease of assembly and disassembly, the device once properly assembled is a safe, rigid and durable unit.

What is claimed is:

1. A device of the character described comprising a pair of spaced side support members each including a generally elongated medial portion disposed in a substantially vertical plane and inclined at an angle from the horizontal, said support members each including a front leg secured integrally to said medial portion adjacent the upper end thereof and extending downwardly from said medial portion, said front leg portion being disposed at an angle from the vertical oppositely from said medial portion, said medial portion having its bottom end disposed in substantially the same horizontal plane as the bottom of said front leg, said support members each including an upwardly extending rear support portion secured integrally adjacent the bottom end of said medial portion, a table panel removably secured between said support members adjacent the upper ends of said medial portions, a bench panel disposed parallel to said table panel secured between said side support members and spaced downwardly from said table panel, said bench panel being mounted removably on said rear supports and said medial portions, and a pair of front leg extensions each being slidably mounted on said front legs and selectively movable relative thereto to extend below said ends of said front legs.

2. A device as described in claim 1 further defined by a pair of inwardly extending generally planar bracket members secured to said side support members adjacent the upper ends of said medial portions, said table panel having a pair of longitudinal generally planar slots adjacent the respective ends thereof adapted to receive said bracket members to secure said table panel between said side support members, a pair of vertically disposed latch plates extending upwardly from said medial portions, said plates each having a generally elongated slot therein with an enlarged upper opening, a pair of latches secured adjacent the ends and forward edge of said bench panel and having longitudinally extending latch pins for removably engaging said slots in said latch plates, and said table and bench panels each being telescopically expandable for varying the length thereof.

3. A device of the character described comprising a pair of spaced side support members each including a generally elongated medial portion disposed in a substantially vertical plane and inclined at an angle from the horizontal, an upper arcuate portion joined integrally to said medial portion adjacent the upper end thereof, a front leg portion joined integrally to said upper arcuate portion and extending downwardly and away from said medial portion at an angle to the vertical, a lower arcuate portion joined integrally to said medial portion adjacent the lower end thereof, and an upwardly extending rear support portion joined integrally to said lower arcuate portion, said support members each being made of a single continuous piece of tubular stock; a pair of brackets each secured to one of said support members adjacent said upper arcuate portions thereof, said brackets each including an inwardly extending substantially horizontal plate which is spaced below said upper arcuate portions; a rectangular table panel having a pair of longitudinal planar slots adjacent the respective ends thereof secured between said support members with said slots receiving said inwardly extending bracket plates, said table panel having its ends spaced below said upper arcuate portions with the corners of said panel being disposed adjacent said front leg and medial portions of said side support members; a latch plate secured to said medial portion in confronting relationship with the upper end of said rear support portion and in substantially the same horizontal plane therewith; and a rectangular bench panel secured between said side support members with said bench panel partially supported on said rear support portions, said bench panel having a pair of latches secured adjacent the ends and forward edge thereof and having longitudinally disposed latch pins extending beyond the respective ends of said bench panel for removable engagement with said latch plates to provide support for the forward portion of said bench panel, said bench panel being pivotal about a longitudinal axis through said latch pins and having its rear edge portion supported on said rear support portions of said side members.

References Cited in the file of this patent

UNITED STATES PATENTS

| | | |
|---|---|---|
| D. 169,012 | Musacco | Mar. 10, 1953 |
| 940,023 | Hutchinson | Nov. 16, 1909 |
| 1,170,594 | Young | Feb. 8, 1916 |
| 2,696,246 | Putnam | Dec. 7, 1954 |
| 2,711,545 | Moore | June 28, 1955 |
| 2,849,053 | Beller et al. | Aug. 28, 1958 |
| 3,034,827 | Rassier | May 15, 1962 |
| 3,061,369 | Haunost | Oct. 30, 1962 |

FOREIGN PATENTS

| | | |
|---|---|---|
| 801,010 | Germany | Dec. 18, 1950 |